United States Patent
Schmidt (10) Patent No.: US 7,487,002 B2
(45) Date of Patent: Feb. 3, 2009

(54) METHOD AND SYSTEM FOR DETERMINING UTILIZATION OF PROCESS TOOLS IN A MANUFACTURING ENVIRONMENT BASED ON CHARACTERISTICS OF AN AUTOMATED MATERIAL HANDLING SYSTEM

(75) Inventor: Kilian Schmidt, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 253 days.

(21) Appl. No.: 11/623,619

(22) Filed: Jan. 16, 2007

(65) Prior Publication Data

US 2007/0282475 A1 Dec. 6, 2007

(30) Foreign Application Priority Data

May 31, 2006 (DE) ........................ 10 2006 025 352

(51) Int. Cl.
*G06F 19/00* (2006.01)

(52) U.S. Cl. ..................... 700/112; 700/99; 700/103; 700/175

(58) Field of Classification Search ................... 700/95, 700/97, 99, 103, 112, 113, 159, 171, 174, 700/175, 228, 229; 705/7

See application file for complete search history.

(56) References Cited

U.S. PATENT DOCUMENTS

| | | | | |
|---|---|---|---|---|
| 5,177,684 A | * | 1/1993 | Harker et al. | 701/117 |
| 5,571,325 A | * | 11/1996 | Ueyama et al. | 118/320 |
| 6,157,866 A | * | 12/2000 | Conboy et al. | 700/121 |
| 6,615,093 B1 | | 9/2003 | Chung et al. | |
| 2002/0019759 A1 | * | 2/2002 | Arunapuram et al. | 705/7 |

FOREIGN PATENT DOCUMENTS

| | | | |
|---|---|---|---|
| DE | 101 23 805 A1 | | 5/2001 |
| DE | 102 57 200 A1 | | 12/2002 |
| JP | 11163087 A | * | 6/1999 |
| JP | 2005310112 A | * | 11/2005 |
| JP | 2006173448 A | * | 6/2006 |

\* cited by examiner

*Primary Examiner*—Crystal J Barnes Bullock
(74) *Attorney, Agent, or Firm*—Williams, Morgan & Amerson (57) ABSTRACT

By determining a metric for tool utilization in a manufacturing environment on the basis of tool-specific characteristics and a probability distribution for the transport capability of an automated material handling system, the influence of the transport system on the tool performance may be effectively determined. For this purpose, an average delay caused by the automated material handling system may be iteratively calculated on the basis of a respective required carrier exchange time, which depends on tool- and process-specific characteristics. From the corresponding average delay, an appropriate metric, such as a utilization loss factor, may be determined.

20 Claims, 5 Drawing Sheets

METHOD AND SYSTEM FOR DETERMINING UTILIZATION OF PROCESS TOOLS IN A MANUFACTURING ENVIRONMENT BASED ON CHARACTERISTICS OF AN AUTOMATED MATERIAL HANDLING SYSTEM

BACKGROUND OF THE INVENTION

1. Field of the Invention

Generally, the present disclosure relates to manufacturing processes, and, more particularly, to the assessment of a manufacturing environment, such as a semiconductor facility, in which a plurality of different product types and process and metrology tools are supplied with products on the basis of an automated material handling system (AMHS).

2. Description of the Related Art

Today's global market forces manufacturers of mass products to offer high quality products at a low price. It is thus important to improve yield and process efficiency to minimize production costs. This holds especially true in industrial fields in which highly complex process tools operate on complex products according to specified process parameters that may vary between different product types. A prominent example in this respect represents the field of semiconductor fabrication since, here, it is essential to combine cutting-edge technology with mass production techniques. It is, therefore, the goal of semiconductor manufacturers to reduce the consumption of raw materials and consumables while at the same time improve process tool utilization. The latter aspect is especially important since, in modern semiconductor facilities, the equipment that is required is extremely cost intensive and represents the dominant part of the total production costs.

Integrated circuits are one example of a mass-produced product that is typically manufactured in automated or semi-automated facilities, thereby passing through a large number of process and metrology steps to complete the device. The number and the type of process steps and metrology steps a product, such as a semiconductor device, has to go through depends on the specifics of the product to be fabricated. For example, a typical process flow for an integrated circuit may include a plurality of photolithography steps to image a circuit pattern for a specific device layer into a resist layer, which is subsequently patterned to form a resist mask for further processes for structuring the device layer under consideration by, for example, etch or implant processes, deposition processes, heat treatments, cleaning processes and the like. Thus, layer after layer, a plurality of process steps are performed based on a specific lithographic mask set for the various layers of the specified device. For instance, a sophisticated CPU requires several hundred process steps, each of which has to be carried out within specified process margins so as to fulfill the specifications for the device under consideration. As the majority of the process margins are device-specific, many of the metrology processes and the actual manufacturing processes are specifically designed for the device under consideration and require specific parameter settings at the adequate metrology and process tools.

In many production plants, such as semiconductor facilities, a plurality of different product types are usually manufactured at the same time, such as memory chips of different design and storage capacity, CPUs of different design and operating speed and the like, wherein the number of different product types may even reach a hundred and more in production lines for manufacturing ASICs (application specific ICs). Since each of the different product types may require a specific process flow, specific settings in the various process tools, such as different mask sets for the lithography, different process parameters for deposition tools, etch tools, implantation tools, chemical mechanical polishing (CMP) tools, furnaces and the like, may be necessary. Consequently, a plurality of different tool parameter settings and product types may be encountered simultaneously in a manufacturing environment. As a consequence, passing the various product types through the plurality of process tools requires a complex scheduling regime to ensure high product quality and achieve a high performance, such as a high overall throughput of the process tools to obtain a maximum number of products per time and per tool investment costs. Hence, the tool performance, especially in terms of throughput, is a very critical manufacturing parameter as it significantly affects the overall production costs of the individual products. Therefore, in the field of semiconductor production, various strategies are practiced in an attempt to optimize the stream of products for achieving a high yield with moderate consumption of raw materials.

In semiconductor plants, substrates are usually handled in groups, called lots, which are, depending on the degree of automation, conveyed within the manufacturing environment by an automated transport system, also referred to as automated material handling system (AMHS), delivering the substrates in corresponding carriers to so-called load ports of the tools and picking up carriers therefrom that contain previously processed substrates. Thus, the transport process itself may represent an important factor for efficiently scheduling and managing the manufacturing environment, since the time for loading and unloading carriers may take up to several minutes per carrier exchange event and may be subjected to a great variance, which may result in unwanted idle times at specific process tools, thereby reducing the performance thereof. On the other hand, process tools are increasingly used that integrate more and more functions which may lead to increased cycle times in the process tools. Due to the increased cycle times, possibly in combination with a highly varying lot size encountered in the manufacturing environment due to the large number of different product types that may be processed on demand, the available time for carrier exchange at load ports of process tools may decrease. However, since the variability of the carrier exchange times (CETs) may be high, a significant influence of the transport status in the manufacturing environment on the overall productivity may be observed. Thus, when designing or redesigning a manufacturing environment, for instance by installing new or additional equipment, the tool characteristics with respect to transport capabilities, such as the number of load ports for specific tools and the like, and the capabilities and operational behavior of the AMHS may represent important factors for the performance of the manufacturing environment as a whole.

Thus, in some conventional techniques, it is attempted to assess the influence of the transport capabilities on the overall behavior of the manufacturing environment on the basis of simulation models in order to determine possible tools exhibiting a pronounced dependence on the characteristics of the AMHS. However, this approach requires detailed simulation models that may have to be established under high efforts, while the results of the corresponding calculations may be subjected to uncertainties and variances as are typically associated with simulation models.

In view of the situation described above, there is therefore a need for a technique for more efficiently assessing transport-related issues in a manufacturing environment while avoiding or reducing one or more of the problems identified above.

SUMMARY OF THE INVENTION

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

Generally, the subject matter disclosed herein relates to a technique for estimating the influence of transport capabilities within a manufacturing environment, for instance using an automatic material handling system as typically used in the field of fabricating microstructures and semiconductor devices, on the tool utilization based on tool-specific characteristics. For this purpose, a metric for tool utilization may be efficiently determined substantially without creating uncertainties and inaccuracies typically associated with simulation-based techniques in that, in some illustrative embodiments, the transport capability of the manufacturing environment, which "communicates" with the process tool by delivering substrate carriers thereto and receiving substrate carriers therefrom, is determined on the basis of a range of actual carrier exchange times, which may, in some embodiments, be represented by a probabilistic distribution. Due to the highly efficient determination of utilization-related metrics with respect to the transport capability of the manufacturing environment, important aspects may be estimated, such as the influence of late deliveries of carriers to the respective process tools in terms of utilization loss, the influence of the tool configuration with respect to its carrier exchange capability, for instance based on the number of interfaces for carrier exchange, also referred to as load ports, and the like. Consequently, important decisions during the planning and designing of the manufacturing environment, as well as the operational behavior of the environment, may be assessed with respect to tool utilization, wherein, in various illustrative embodiments, the influence of standard lot sizes, the presence of non-standard lot sizes and the like may also be determined, thereby providing the potential for significantly improving the overall performance of the manufacturing environment by correspondingly re-scheduling the process flow in the manufacturing environment and/or by appropriately adapting the hardware configuration thereof.

According to one illustrative embodiment, a method comprises determining for a specified process tool of a manufacturing environment under given process conditions a required carrier exchange time required for exchanging a substrate carrier containing processed substrates for a substrate carrier containing substrates to be processed in the specific process tool. The method further comprises determining an average delay of delivery of carriers on the basis of the required carrier exchange time and a range of actual carrier exchange times, wherein the range of actual carrier exchange times represents the transport capability within the manufacturing environment. Finally, the method comprises determining a transport-related utilization value for the specified process tool on the basis of the average delay.

According to another illustrative embodiment, a method comprises defining a transport capability of an automated material handling system of a manufacturing environment by a probabilistic distribution for actual carrier exchange times for exchanging substrate carriers with a specific process tool. The method further comprises determining a required carrier exchange time for the specific process tool on the basis of tool characteristics, wherein the specific process tool exchanges carriers containing substrates to be processed and substrates processed in the specific process tool with the automated material handling system. Finally, the method comprises determining a metric for tool utilization of the specific process tool on the basis of the transport capability and the required carrier exchange time.

According to yet another illustrative embodiment, a tool utilization estimation system comprises an input section configured to receive process information related to a specific process tool in a manufacturing environment including an automated material handling system for exchanging substrate carriers with the specific process tool. The system further comprises a transport capability estimator connected to the input section and configured to estimate an average delay of carrier exchange in the specific process tool on the basis of the process information and a range of actual carrier exchange times. Moreover, the system comprises a utilization estimator configured to estimate a utilization loss factor on the basis of the average delay and the process information.

BRIEF DESCRIPTION OF THE DRAWINGS

The disclosure may be understood by reference to the following description taken in conjunction with the accompanying drawings, in which like reference numerals identify like elements, and in which:

FIG. 1b schematically illustrates a time diagram of the transport activity at a load port of the process tool of FIG. 1a;

FIG. 1c schematically illustrates a time diagram of events at the plurality of load ports of the tool of FIG. 1a;

FIG. 1d schematically illustrates a time diagram illustrating the various dependencies of the required carrier exchange time of the tool of FIG. 1a;

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Various illustrative embodiments are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the subject matter disclosed herein. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the subject matter disclosed herein provides a technique for estimating the influence of transport capabilities of a manufacturing environment on specific process tools, wherein enhanced accuracy and efficiency compared to simulation-based methods may be achieved. In some illustrative embodiments, the transport capability of the manufacturing environment, i.e., the capability of exchanging transport carriers with one or more process tools of the environment, may be described by an appropriate distribution of actual carrier exchange times (CET). Typically, in complex manufacturing environments, the actual carrier exchange time may vary significantly depending on a plurality of influences, which may be taken into consideration by providing an appropriately defined distribution around an actual average carrier exchange time. Based on the corresponding quantitatively described transport capability of the manufacturing environment and on the basis of tool-specific characteristics, such as the number of interfaces for exchanging carriers, also referred to as load ports, the capacity of the process tool and the like, the relationship between tool utilization, tool configuration and transport capability of the manufacturing environment may be estimated. Consequently, the subject matter disclosed herein may advantageously support the decision making with respect to important factors of the manufacturing environment, such as tool configuration with respect to the number of load ports, adaptation of the automatic material handling system, for instance by locally adapting the transport capacity thereof, the scheduling of the process flow within the manufacturing environment, for instance in terms of controlling the presence of a specified lot size mixture by correspondingly controlling dispatch rules, and the like. For example, accurate and fast cost-versus-benefit calculations may be performed in order to improve design and planning of the manufacturing environment including the installation and characteristics of specific equipment used therein. Furthermore, the utilization losses of the various process tools in the manufacturing environment, which may be caused by delayed deliveries of substrate carriers, may be estimated, for instance in advance or substantially in real time, in order to identify tools or locations in the manufacturing environment requiring an appropriate adaptation of the transport capacity. Additionally, the influence of different standard lot sizes used in the manufacturing environment for processing substrates may be investigated in order to identify an optimal lot size, wherein, in some illustrative embodiments, the presence of non-standard lot sizes, for instance in the form of pilot lots, test lots and the like, may be efficiently estimated.

Consequently, on the basis of tool characteristics, a required or minimum target performance of the automatic material handling system may be determined, which may then be compared to the actual performance of the transport system in the manufacturing environment in order to estimate a respective deviation between the required or target performance and the actual performance of the transport system. Since the corresponding average delay may have an influence on the required performance of the transport system as required by the specific process tool, in some illustrative embodiments, the average delay may be recalculated on the basis of the previously obtained average delay in order to obtain an updated value for the average delay. If required, the steps of recalculating the required target performance on the basis of a previously estimated average delay may be repeated in an iterative fashion until a desired degree of accuracy is obtained. On the basis of the determined average delay, which is a function of the tool characteristics and the actual transport capabilities of the automated material handling system, and based on the process characteristics for a specified operational mode, for instance for specific process recipes performed on the process tool under consideration, an appropriate metric for the tool utilization may be obtained. For instance, in some illustrative embodiments, a utilization loss factor may be determined that describes the fraction of utilization lost due to a specific delay in carrier delivery by the automatic material handling system.

It should be appreciated that the subject matter disclosed herein is highly advantageous in the context of complex manufacturing environments, such as used for the fabrication of semiconductor devices, microstructures, and other products involving manufacturing processes on the basis of micro-mechanic, micro-electronic and micro-optical fabrication techniques, since here a plurality of different product types are to be stepped through a plurality of highly complex process tools in a substantially automated fashion. The principles of the subject matter disclosed herein may, however, also be advantageously applied to other manufacturing environments requiring the automatic management of products within a complex manufacturing environment including a plurality of complex process tools. Consequently, unless explicitly stated in the specification and/or the appended claims, the present invention should not be restricted to the manufacturing of microstructural devices formed on the basis of respective substrates.

Figure 1A:
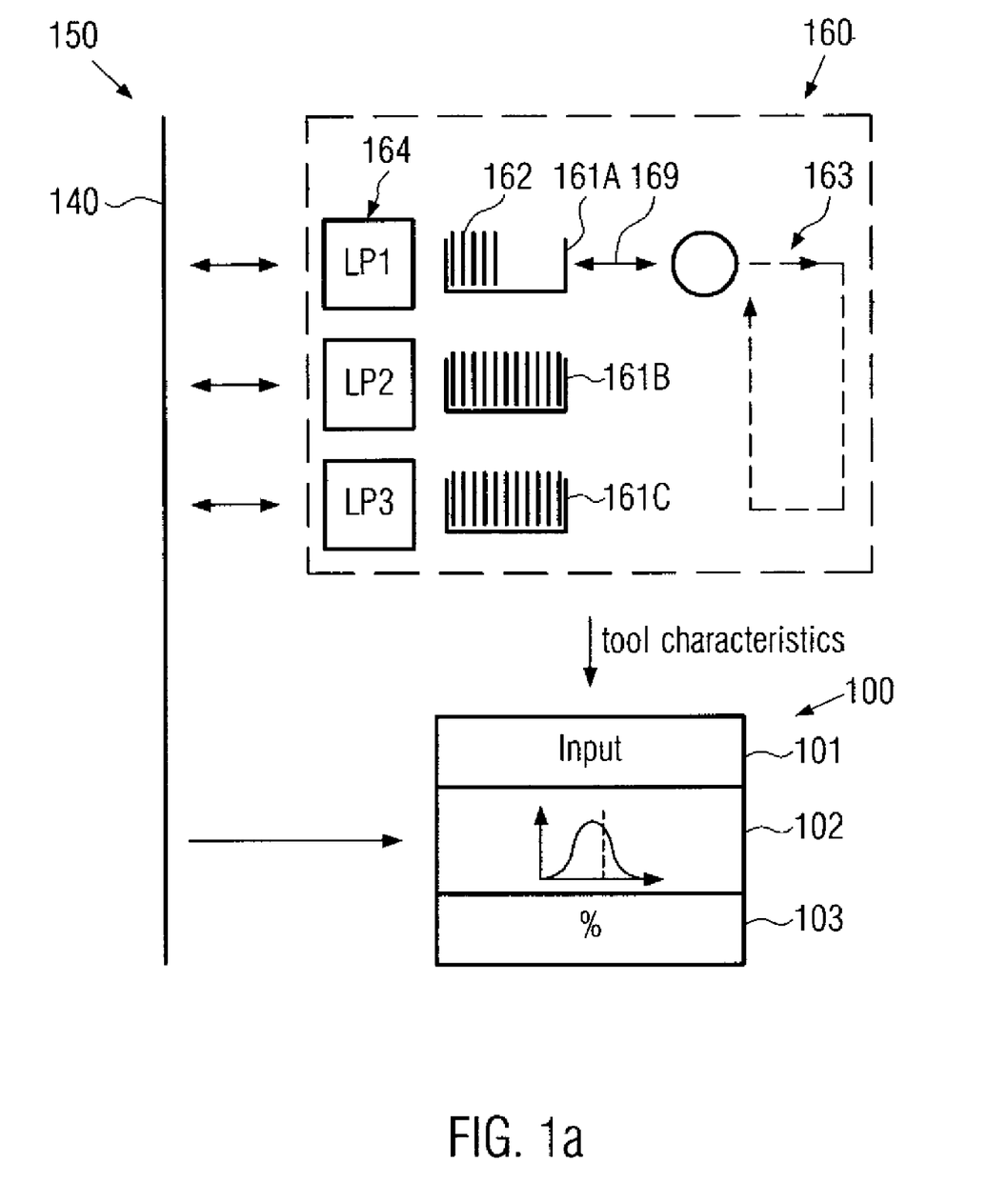
FIG. 1a schematically illustrates a manufacturing environment comprising an automated material handling system (AMHS) and a process tool exchanging substrate carriers therewith and a system for estimating tool utilization according to illustrative embodiments disclosed herein.

FIG. 1a schematically illustrates a manufacturing environment 150 comprising a plurality of process tools 160 wherein, for convenience, only one single process tool 160 is illustrated in FIG. 1a. The one or more process tools 160 may be configured to receive products to be processed on the basis of respective carriers 161, which may be designed to contain a predefined maximum number of products. As previously explained, in illustrative embodiments, the carriers 161 may represent appropriate transportation containers for containing a plurality of substrates 162, which may be appropriate for forming thereon and therein microstructural devices, such as integrated circuits and the like. Thus, it should be appreciated that the term "carrier" is to represent any appropriate container for transporting therein products to be processed in the process tool 160. Similarly, the term "substrate" is to be understood as to represent any products to be processed in the tool 160, wherein, in specific embodiments, the substrates 162 represent substrates for manufacturing microstructural devices.

As previously explained, the process tool 160 may have implemented therein a plurality of process modules configured for performing certain processes therein such that each of the substrates 162 has to pass through at least a part of the respective process modules in order to complete a desired process sequence. It should be appreciated that, depending on the configuration of the tool 160, several subsequent process steps may be implemented, wherein one or more of the several process steps may allow a certain degree of parallelism in processing the substrates 162. For convenience, the plurality of process modules may be indicated as 163 and may also be indicated as a functional block, wherein relevant characteristics of the process module block 163 may be described by appropriate parameters, such as cycle time, which may be understood as the time interval required for passing a single substrate through a process module block 163 in order to complete the processing of the specific substrate 162. Another parameter may be the amount of substrates 162 that may be simultaneously processed in the block 163. It should be noted that these tool characteristics depend on the configuration of the tool 160 and in particular on the configuration of the block 163 and partially on process flow characteristics, such as the respective process recipes to be used in the individual process modules of the block 163. For example, the cycle time may change when one or more of the process recipes of process modules of the block 163 are modified, for instance due to the processing of a different type of substrate, or general changes in the process recipe, and the like. Furthermore, the configuration of the block 163 may temporarily change due to a hardware failure of one of the process modules, maintenance, replacement of consumables and the like.

The one or more process tools 160 may further comprise one or more interfaces 164 for receiving and discharging the carriers 161, wherein these hardware interfaces 164 may also be referred to as load ports. It should be appreciated that the one or more load ports 164 may have any appropriate configuration for automatically receiving the carriers 161 and to "communicate" with a tool-internal substrate handling system, schematically indicated as 169, for providing substrates 162 to the functional block 163 and receiving respectively processed substrates therefrom. The load ports 164 are further configured to receive respective carriers 161 from an automated material handling system 140 and to provide carriers containing processed substrates 162 to the system 140. Hereinafter, the process of transferring one carrier containing processed substrates from any of the load ports 164 to the transport system 140 and ensuring transferring one carrier containing substrates to be processed at the tool 160 from the transport system 140 to said load port is together referred to as carrier exchange. The automated material handling system 140 substantially represents the transport capabilities within the manufacturing environment 150 and may have any appropriate configuration in order to receive and deliver the carriers 161 to the one or more process tools 160. As previously explained, the system 140 may actually represent a highly complex transport system connecting a plurality of complex process tools 160, wherein the actual time interval required for a carrier exchange may be determined by a plurality of influences, such as operational behavior of the process tools, the amount of substrates presently processed in the environment 150, the degree of research and development activities within the environment 150, availability of transport resources in the system 140, the schedule for coordinating the overall process flow in the environment 150 and the like. Consequently, the characteristics of the system 140 in terms of transport capability may be described on the basis of a range of carrier exchange times in order to accommodate the plurality of influences determining the operational behavior of the system 140, as will be described in more detail later on.

In FIG. 1*a* there is further shown a tool utilization estimation system 100, which is operatively connected or related to the manufacturing environment 150 by, for instance, receiving process information therefrom, which, in some illustrative embodiments, may include tool characteristics of the one or more process tools 160 and an appropriate representation of the transport capability of the system 140, for instance in the form of an appropriate range of actual carrier exchange times and the like. In some illustrative embodiments, the "connection" of the system 100 and the manufacturing environment 150 may be substantially established by the process information substantially without requiring any other "hardware" connection to the environment 150. Thus, in this case, the manufacturing environment 150, i.e., the system 140 and/or the plurality of process tools 160 provided therein, may be represented by the specific process information supplied to the system 100, thereby allowing the environment 150 to be defined in any appropriate state including a virtual state, a partially completed state, a completed state and the like. For instance, the environment 150 may represent the design of a manufacturing environment corresponding to a specific status, wherein corresponding process information may have been obtained on the basis of a real environment having similar characteristics compared to the environment 150. Thus, when designing the environment 150, a transport capability of the system 140 may be represented by an appropriate distribution of actual carrier exchange times, while the characteristics of the tool 160 may be determined based on specifications, simulations, experience and the like. In other cases, a portion of the environment 150 may be established in a real configuration, while other components, such as the tool 160 or portions thereof, for instance the configuration with respect to the number of load ports 164 and the like, may be provided to the system 100 in the form of process information in order to provide means for estimating the relationship between the transport system 140 and the tool 160 having a different configuration so as to facilitate the decision finding process for actually equipping the manufacturing environment 150. In other illustrative embodiments, the "connection" of the system 100 to the environment 150 may be established on the basis of process information obtained from an actually installed environment on the basis of the real operational behavior of the environment 150 in order to determine tool utilization for the one or more process tools 160 under specific process conditions, wherein the various process conditions may not necessarily have to actually occur in the environment 150. In still other illustrative embodiments, the system 100 may be connected to the environment 150 by any appropriate communications link in order to obtain real time information or at least information correlated to a process situation within a specified time horizon in order to appropriately monitor and/or control the process flow within the environment 150 in terms of utilization loss with respect to transport capabilities, lot size mixture and the like.

The system 100 may comprise an input section 101 for receiving the process information including tool characteristics and transport capabilities as previously described. Moreover, the system 100 may further comprise a transport capability estimator 102 that is configured to estimate an average delay of carrier exchange between the system 140 and the process tool 160 on the basis of a respective representation of the transport capabilities of the system 140. That is, the transport capability estimator 102 may, in some illustrative embodiments, be configured to extract an appropriate representation for the actual carrier exchange times of the system 140, which, in some illustrative embodiments, may be accomplished on the basis of a probabilistic distribution of actual carrier exchange times, and determine therefrom and from tool-specific characteristics based on the number of substrates 162, the number of load ports 164 and the process specifics of the functional block 163 a representative metric for the actual process capability for carrier exchange. For example, the transport capability estimator 102 may determine from the tool characteristics a required or minimum target carrier exchange time, as may be dictated by the specific tool configuration and a specific process condition, and the required carrier exchange time may be compared to the respective actual carrier exchange time range in order to determine therefrom a representative delay for the exchange of the carriers 161 for the specified tool configuration and the specific process condition. Furthermore, the system 100 may comprise a utilization estimator 103 which may be configured to determine a utilization-related metric for the tool 160 on the basis of the metric, such as the average or representative carrier exchange delay, provided by the transport capability estimator 102, as will be described in more detail later on.

During operation of the environment 150, irrespective of whether the environment 150 is to represent a virtual environment or a real environment, partially or completely, a certain amount of substrates 162 are dispatched on the basis of a predefined dispatching list or scheduling regime, which may be designed so as to coordinate the process flow within the environment 150 on the basis of certain criteria. The substrates dispatched may have to step through a plurality of complex processes, including a plurality of process steps, some of which may be performed in the process tool 160. Due to an ongoing tendency in the field of semiconductor production, many process tools may be able to perform a plurality of process steps with a certain degree of parallelism and hence delivering and fetching substrates to and from the respective process tool 160 represents an important criterion for enhancing the process flow within the environment 150. Thus, at one or more stages of the process flow, the substrates 162 have to be processed in the tool 160 and are delivered thereto by the automated material handling system 140, wherein the substrate transfer is performed by carrier exchange between the system 140 and the one or more load ports 164. Typically, a single carrier exchange event may take several minutes, wherein a significant deviation from a respective average carrier exchange time may be observed in the environment 150. After receiving the respective carrier 161 in one or more of the load ports 164, a schematically depicted internal robot handler 169 may supply the substrates 162 from a respective one of the load ports 164, for instance, as shown in FIG. 1*a*, from the load port LP1, to the functional module 163, which are then stepped through the plurality of process modules comprised therein. Such robotic handling systems are well known to those skilled in the art.

As previously noted, the functional module 163 may comprise a plurality of process modules operating on specific process recipes resulting in a cycle time for each substrate 162 that may be assumed to be substantially constant, although different process times in at least some of the processes may occur. Moreover, the cycle time for passing a single substrate 162 through the functional block 163 may vary for different types of products due to different process recipes and the like. In the following it will be assumed that, at least temporarily, the cycle time may be substantially constant, at least for a specific time interval for which the utilization of the process tool 160 is to be determined. In other illustrative embodiments, respective cycle times may be assigned to each carrier 161 arriving at the tool 160 on the basis of respective process information and hence the corresponding cycle times may be considered as variable cycle times, thereby taking into consideration the respective process specifics associated with the substrates to be presently processed in the functional block 163. For instance, if the functional block 163 may include a deposition process, wherein a layer thickness may vary, depending on product type and the like, different cycle times may be involved with different substrates 162, depending on the required layer thickness to be formed in one of the processes in the block 163.

After the last substrate 162 is entered into the functional block 163, a substrate 162 of another carrier positioned on another load port may be entered into the functional block 163, while a plurality of substrates 162 of the carrier in the load port LP1 may as well still be in process within the functional block 163. After the substrates 162 of the carrier in the load port LP1 have been cycled through the block 163, a respective carrier, such as the carrier 161, may be ready to be exchanged with another carrier provided by the system 140. Optimal tool utilization of the tool 160 may depend on a continuous delivery of non-processed substrates 162 to the functional block 163 and to a continuous discharge of processed substrates therefrom. If, however, there is an undue delay of a carrier exchange at the load port LP1, this load port may neither supply "fresh" substrates nor receive already processed substrates. In this case, a plurality of unproductive cycles may elapse in the block 163, when the substrates 162 in the other carriers 161B, 161C at the load ports LP2, LP3 have been entered into the block 163. Furthermore, in some cases, one or more of the carriers 161 may include a different number of substrates, referred to as lot size, which may therefore also have a significant influence on the operational behavior of the tool 160. Consequently, the number of load ports, which may serve as a substrate buffer, the actual lot size in the respective carriers 161 and the operational characteristics of the functional block 163 may, in combination with the actual carrier exchange time, determine the degree of utilization of the tool 160.

Figure 1B:
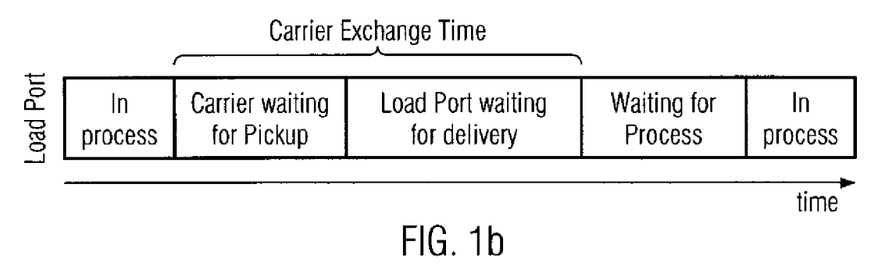

FIG. 1*b* schematically illustrates a time progression of events or activities occurring at one of the load ports 164 during operation of the process tool 160. For example, during a first time interval, indicated as "in process," the substrates 162 in the respective load port may be cycled through the block 163 and may finally be collected as processed substrates in a respective carrier. Consequently, after the last processed substrate is placed in the respective carrier, the time interval "in process" is completed and the carrier exchange time (CET) starts. The carrier exchange time may include a phase in which a respective carrier containing the processed substrates is waiting to be picked up by the system 140. As previously explained, this process may take several minutes and may depend on a plurality of factors. Thereafter, in a next phase, the respective load port may wait for the delivery of a further carrier, which may also take several minutes and may be subjected, similarly as the time for waiting for pickup, to a certain variance. After the respective carrier is positioned on the respective load port, depending on the operational status of the tool 160, the carrier may have to wait to be processed, wherein the length of this time interval may depend on the tool characteristics, such as cycle time and the number of substrates still present in the process tool. When the functional block 163 is ready to receive further substrates, a further interval "in process" may begin for the newly exchanged carrier on the respective load port. When substantially the same processes are performed in the block 163 for all substrates presently provided within the tool 160, the duration of the respective time intervals "in process" may, for a constant lot size, be substantially constant, whereas for a varying lot size and/or for varying process recipes in one or more of the processes performed in the function block 163, a varying length of the respective "in process" interval may be obtained.

Figure 1C:
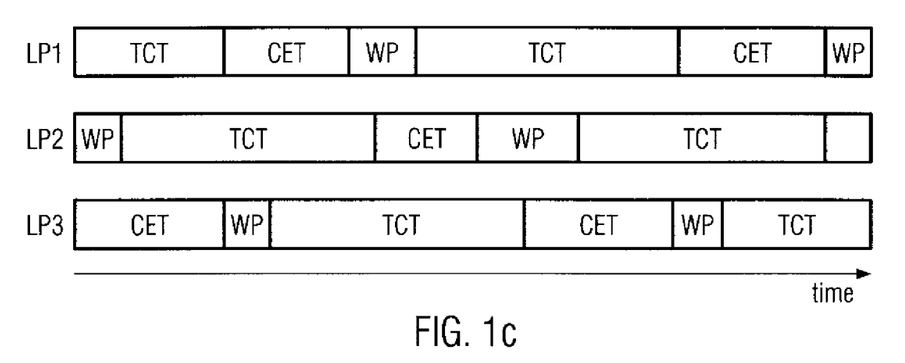

FIG. 1c schematically illustrates a corresponding time diagram for the load ports 164, i.e., for the case of three load ports LP1, LP2 and LP3 in the tool 160 as shown in FIG. 1a. Thus, in each of the load ports 164, a corresponding interval "in process" occurs, which is now indicated as total cycle time (TCT), which may be assumed to be substantially constant under the conditions as discussed above. Moreover, a respective carrier exchange time (CET) and a respective interval "waiting for process" (WP) are indicated prior to each TCT interval. As previously discussed, the respective CET and WP intervals may vary significantly depending on the tool configuration and the transport capability of the system 140, as previously explained. As is indicated in FIG. 1c, in each of the load ports LP1, LP2, LP3, a certain time interval WP is present prior to each TCT interval, thereby ensuring high tool performance of the tool 160, since, in each of the load ports 164, a respective substrate may be available as soon as requested by the functional block 163, since a respective carrier is in its respective WP state. Consequently, the CET interval may in principle be extended to a limit so as to "consume" the associated WP interval without causing a loss of productivity in the tool 160. Hence, as long as the actual carrier exchange process results in a corresponding WP interval, even if the corresponding length is substantially zero, high productivity is ensured. However, if a corresponding WP interval is zero or may become even "negative," which may be interpreted as a "PW" interval, that is, "the process is waiting for the wafer," a corresponding productivity loss is created. The corresponding maximum carrier exchange time without causing productivity loss may be referred to as target CET or required CET, since this value defines a minimum transport capability that has to be provided by the system 140 in order to ensure an operational behavior of the tool 160 without productivity loss caused by the system 140.

Figure 1D:
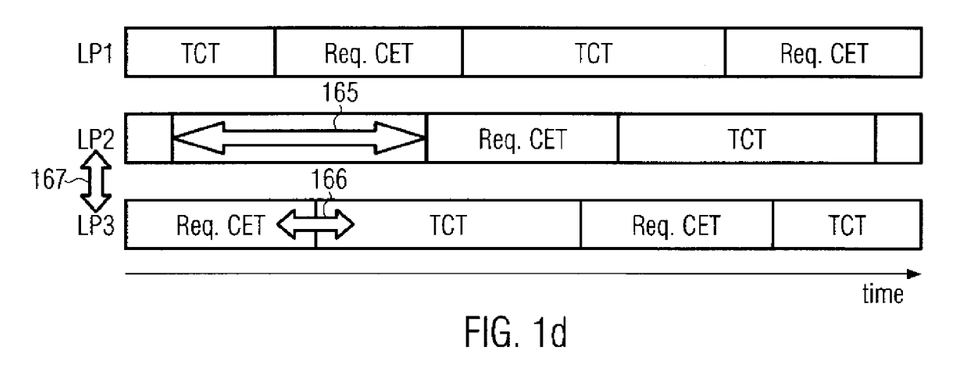

FIG. 1d schematically illustrates a time diagram, wherein the individual load ports 164 are served by the system 140 on the basis of the respective required CETs. That is, in the diagram shown in FIG. 1d, the delivery and discharge of carriers from the respective load ports may be performed on the basis of a carrier exchange time corresponding to the target or required CET as defined above. The required CET may depend on a plurality of tool- and process-specific characteristics, such as the total number of substrates present on other carriers 161 that are presently positioned on one of the load ports which are currently not delivering or receiving substrates from the functional block 163. That is, as previously discussed, the number of substrates presently not processed in the block 163 may represent a certain amount of buffer and may thus correspond to a certain amount of number of productive cycles of the block 163 that is available for maintaining the functional block 163 busy. Moreover, the corresponding required CET may depend on the cycle time for an individual substrate when passed through the functional block 163, wherein for a constant lot size, i.e., the number of substrates contained in the carriers 161, the total cycle time "TCT" may be determined by the cycle time and the degree of parallelism of the processing in the block 163, that is, by the total number of substrates that may be processed concurrently. Hence, the TCT interval influences the required CET, as indicated by arrow 165. For instance, for a reduced TCT interval, the available time for carrier exchange for otherwise identical process conditions may be reduced, thus demanding a longer required CET, and vice versa, as indicated by arrow 166. Moreover, the number of load ports 164 also significantly affects the required CET, as indicated by arrow 167, as the number of load ports may significantly determine the capability of the process tool 160 for "communicating" with the manufacturing environment 150 via the system 140.

In one illustrative embodiment, the transport capability estimator 102 of the system 100 may be configured to determine the required CET on the basis of tool characteristics as specified above according to Equation 1:

$$\text{Required } CET = (\Sigma WOOC - \Sigma WITS) \times WI \quad (1)$$

wherein WOOC represents the number of wafers or substrates on other carriers, that is, on carriers present or to be present on load ports other than the load port whose carrier is to be exchanged, WITS represents the substrates or wafers that are simultaneously in the functional block 163 and WI represents the wafer interval, which is defined as the time that elapses between consecutive wafers leaving the functional block 163. When a constant lot size, i.e., a constant number of substrates within the carriers 161, is assumed, at least during a specific time interval, the first term in Equation 1 on the right hand side may be calculated according to Equation 2:

$$\Sigma WOOC = (\Sigma LP - 1) \times \text{lot size} \quad (2)$$

wherein the first term at the right hand side of Equation 2 represents the number of load ports 164 that the tool 160 encompasses. Consequently, the transport capability estimator 102 may determine the required CET on the basis of tool characteristics, wherein it should be appreciated that, as previously discussed, process-specific characteristics may also be included into the calculation of the required CET, for instance by using appropriate cycle times, which may depend on the specific processes to be performed in the functional block 163. The corresponding values may be communicated to the system 100 in the form of respective process information at any appropriate point in time. For example, the process information obtained for determining the respective required CET may represent a virtual configuration of the environment 150, when different scenarios may have to be assessed with respect to tool utilization and the like. In other cases, the process information received by the system 100 may reflect a "real" process situation at a given time.

Moreover, the transport capability estimator 102 may have implemented therein or may receive actual carrier exchange times that describe the operational behavior of the system 140, irrespective of whether the system 140 may represent a virtual or a real component of the environment 150. As previously discussed, the actual carrier exchange times encountered for a moderately complex manufacturing environment may exhibit a significant variance, wherein, in some cases, the corresponding influences may be considered as quasi-random, thereby allowing an efficient use of statistical techniques in determining a representative average actual CET with a corresponding measure of the variance of the respective distribution. For example, normal probability density function or lognormal density function may, in some illustrative embodiments, be used in order to appropriately represent the operational behavior of the system 140. In other cases, other distributions, for instance obtained from experience, from experimental data, from process monitoring of the environment 150 and the like, may be used in order to provide an appropriate "model" for the transport capabilities of the environment 150.

Figure 1E:
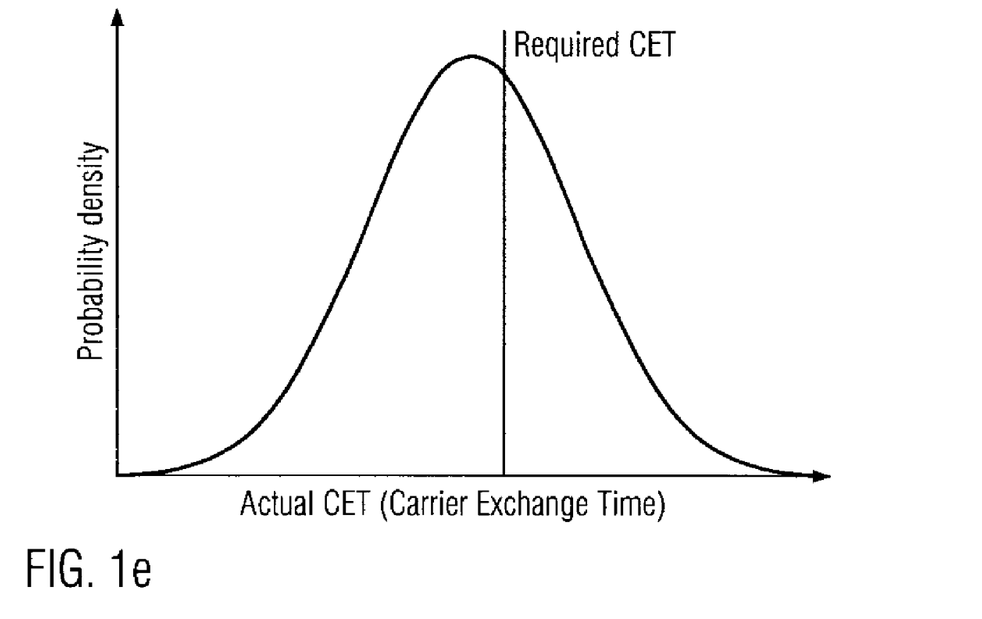
FIGS. 1e-1f schematically illustrate a range of actual carrier exchange times on the basis of a probabilistic function in accordance with illustrative embodiments disclosed herein.

FIG. 1e schematically illustrates a normal probability density function for actual carrier exchange times, wherein the maximum of the density function may represent the average actual carrier exchange time for the system 140. It should be appreciated that the corresponding density function may be appropriately modified, for instance for representing a plurality of different configurations of the system 140, as may be required for the assessment of the environment 150. In other cases, as previously discussed, experimental data may be used to derive a corresponding density function representing the system 140. It should be appreciated that using a standard probability distribution may be advantageous in terms of calculation time and thus performance of the estimation system 100. In other illustrative embodiments, the corresponding range of actual CET values may be described in any appropriate format, for instance on the basis of respective tables correlating a specific carrier exchange time with an appropriate weighting factor and the like. FIG. 1e further illustrates a required CET value, which may, for instance, be calculated on the basis of Equations 1 or 2 by the transport capability estimator 102. In the illustrative example shown in FIG. 1e, the required CET may be greater than the corresponding average CET, i.e., the maximum of the distribution, thereby indicating that, in principle, the performance of the system 140 may be appropriate, since the average actual CET is less than the required CET, thereby resulting in no performance losses. However, actual carrier exchange times greater than the determined required CET may lead to respective utilization losses, as previously explained.

Figure 1F:
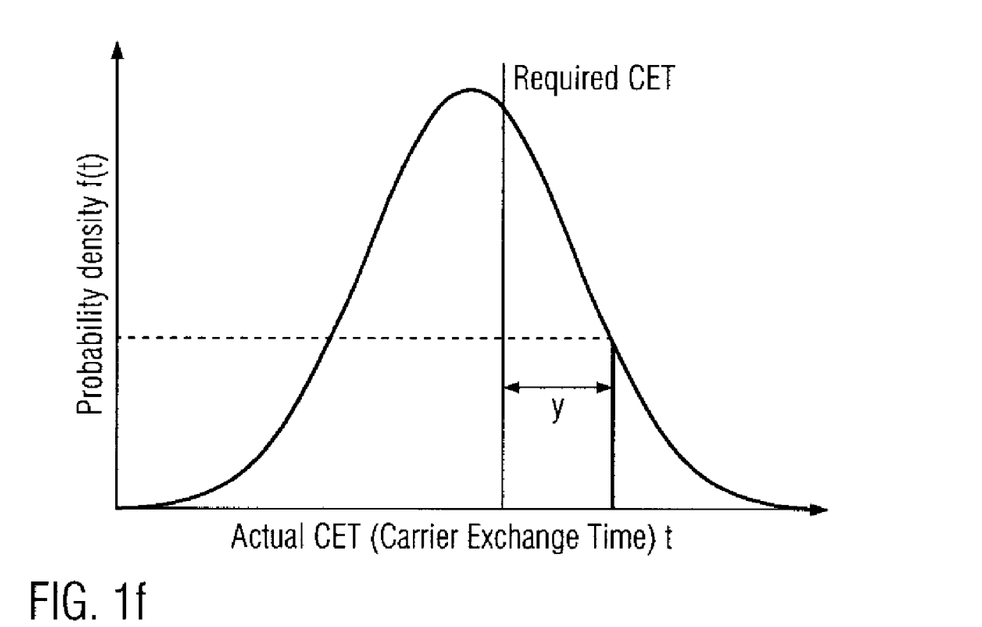

FIG. 1f schematically illustrates this situation. That is, for any carrier exchange time CET greater than the calculated required CET, a certain delay, indicated as y, is caused in terms of carrier delivery, wherein each value of delay is associated with a respective probability described by the respective function. Consequently, based on the corresponding probability for each delay, or any other appropriately selected weighting factor, a representative averaged delay may be determined for the specific required CET value. For instance, for all possible delays, i.e., for all t values greater than the required CET, the respective probabilities or weighting factors may be summed or integrated and appropriately weighted so as to determine an appropriately averaged delay for the specific process condition described by the tool characteristics, for instance provided in the form of the parameters described above with reference to FIG. 1c, and the distribution of the actual CET values describing the system 140. Consequently, the transport capability estimator 102 may provide a respective average delay based on which the utilization estimator may derive an appropriate metric for the tool performance with respect to the relationship of the process tool 160 and the system 140. For example, the utilization estimator 103 may determine a degree of utilization loss as an appropriate metric for the tool performance by the fraction of the average delay per lot with respect to the actual total process time of a specific lot including the average delay. However, other utilization-related metrics may be derived on the basis of the average delay determined by the transport capability estimator 102.

In some illustrative embodiments, the influence of the average delay on the tool behavior, for instance with respect to the required CET, when a certain average delay is assumed, may be taken into consideration by performing an iterative sequence in order to determine an updated average delay by recalculating an updated version of the required CET, which may then be used for obtaining a new averaged delay.

Figure 1G:
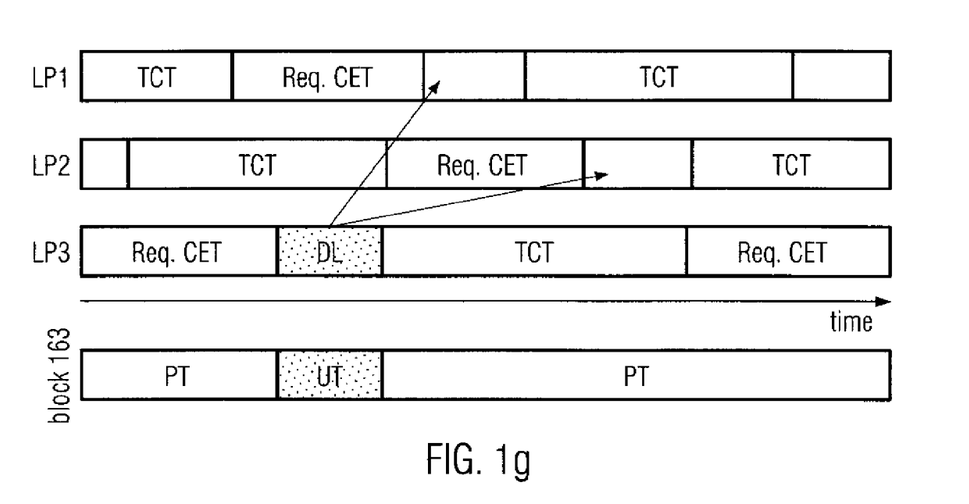
FIGS. 1g-1h schematically illustrate time diagrams for illustrating the influence of delayed deliveries of carriers on the operational behavior of the process tool of FIG. 1a according to illustrative embodiments disclosed herein.

FIG. 1g schematically illustrates a time diagram representing the process tool 160, when delay at one of the load ports 164 may occur. For example, it may be assumed that, in load port LP3, the corresponding carrier exchange time may exceed the calculated required CET, as is indicated as an interval "DL," resulting in a corresponding time interval, indicated as "UT," in which the functional block 163 may be subjected to an idle time, thereby resulting in a corresponding number of unproductive cycles. Since the processing of the corresponding carrier at load port LP3 is delayed, the respective required CETs during subsequent exchange events in the other load ports LP1 and LP2 may be increased since now, due to the delay at LP3, a corresponding longer time interval is available for carrier exchange at the other load ports, however at the cost of a respective number of unproductive cycles, thereby reducing tool performance. Consequently, the occurrence of a delay may influence the required CETs, which may be taken into consideration by iteratively determining an average delay, recalculating the corresponding required CETs, obtaining an updated average delay, recalculating the required CETs, obtaining a new updated average delay, and so on, until a desired degree of accuracy or convergence is obtained or any other criterion is fulfilled. In one illustrative embodiment, the iterative calculation may be performed based on the assumption of identical lot sizes, wherein it may further be assumed that an average delay occurs at each carrier exchange event. In this case, the dynamic problem is converted into a static problem and allows an efficient determination of a highly accurate average delay. Consequently, in one illustrative embodiment, the iterative calculation of the required CET may be established under the assumption that, in a second iterative step based on a first average delay, the newly required CET is a function of the previously obtained required CET and the previously determined delay, that is, the required $CET_{DL}$=F(required CET, average delay), while the delay is a function of the required newly determined CET and of the distribution of actual CETs. For instance, for a normal probability density function, the average delay may be calculated from the average actual CET, i.e., in FIGS. 1e and 1f the maximum of the probability density, and a standard deviation of the probability density function.

Figure 1H:
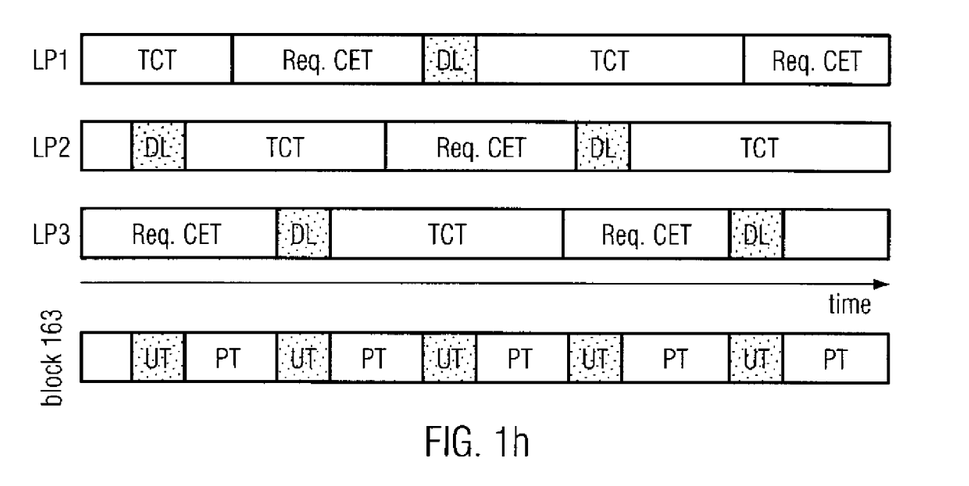

FIG. 1h schematically illustrates a time diagram illustrating the situation when using the assumptions identified above, i.e., assuming the occurrence of an average delay at every carrier exchange event. As is evident from FIG. 1h, at each load port, a corresponding constant time interval DL may be assumed, resulting in corresponding unproductive cycles for the block 163. Hence, based on the corresponding tool behavior as indicated in FIG. 1h, the respective delays may be calculated until a desired degree of accuracy is obtained. For instance, for the tool configuration as shown above, i.e., three load ports, it may be assumed that the further tool characteristics may be as follows:

The wafer interval (WI) may be 20 seconds;
The number of wafers simultaneously processed in the block 163 (WITS) may be 30;
The substrates on other carriers (WOOC) may be 50, i.e., one carrier 161 having a standard lot size of 25 in each of the other load ports LP2 and LP3; and
The system 140 may be characterized by an average actual CET of 6 minutes with a standard deviation for the actual CET of 2 minutes, wherein it may be assumed that the distribution of the actual CET values is described by a normal density distribution. That is, as shown in FIGS. 1f and 1h, the distribution of the actual CET values may be represented by a probabilistic function, the width of which is defined by the standard deviation.

For such a process situation, the transport capability estimator 102 may perform a first step for determining a first value for the required CET based on Equation 1, which yields, for the above-specified values, 400 seconds, that is 6 minutes and 40 seconds, which may be higher than the average actual CET of 6 minutes. From the determined required CET, in a next step, the estimator 102 may determine a first value for the average delay, that is, as shown in FIG. 1f, the corresponding delays with respect to the previously determined required CET may be calculated, for instance by integrating the respective probability density or values greater than the required CET value determined above. In this case, as a well-known probability distribution is used with a given standard deviation, the corresponding average delay for this step may be determined based on well-known calculation techniques and yields 30.5 seconds.

Thus, as previously discussed with reference to FIGS. 1g and 1h, the mutual correlation between the required CET and the averaged delay may be taken into consideration by iteratively calculating updated versions of the averaged delay. For this purpose, the previously determined required CET plus the calculated average delay may be used as the updated new required CET, as is evident from FIG. 1h, wherein the regular occurrence of the respective DL intervals in combination with the previously determined required CETs now define a new increased required CET. Thus, the newly updated required CET is obtained as 400 seconds plus 30.5 seconds=430.5 seconds. The new required CET value may again be used for determining an updated version of the average delay, which, based on the above-identified normal distribution with an average of 6 minutes and a standard deviation of 2 minutes, yields 20.7 seconds.

Based on the newly obtained average delay of 20.7 seconds, the required CET may be recalculated as described above, thereby resulting in a new value of 420.7 seconds, yielding a new average delay of 23.5 seconds. Using the same procedure results in a new required CET of 423.5 seconds, yielding an average delay of 22.7 seconds. Repeating both steps results in 422.7 seconds for the new required CET and 22.9 seconds for the average delay. As is evident from the above sequence, the differences in average delay may become smaller with an increasing number of iterative steps. For example, repeating the above steps once again results in a new required CET of 422.9 seconds, yielding an average delay of 22.9 seconds, thereby indicating that a high degree of accuracy is reached.

As a consequence, the transport capability estimator 102 may provide an average delay, which may be assumed to occur at every carrier exchange event, thereby correspondingly introducing a number of unproductive cycles, as is for instance shown in FIG. 1h. Consequently, the average delay provided by the transport capability estimator 102 may be used for determining an appropriate utilization-related value or metric in order to assess the tool performance of the tool 160 in view of the relationship between the system 140 and the tool 160. In one illustrative embodiment, the corresponding utilization metric may be provided in the form of a utilization loss factor, which may be illustratively considered as the number of lost cycles (UT) divided by the number of possible cycles for each of the lots processed in the functional block 163. In other words, the utilization loss factor may be considered as the time interval corresponding to the average delay divided by a total time required for processing the substrate in a single carrier, which includes the average delay plus the lot size times the wafer interval time (WI). That is, the utilization loss factor may be defined as the ratio between the average delay for each lot and the total cycle time plus the average delay. Thus, in one illustrative embodiment, the utilization estimator 103 may determine the utilization loss factor as defined above, which may, for the illustrative example described above, i.e., for an average delay of 22.9 seconds, a standard lot size of 25 substrates and a wafer cycle time of 20 seconds, 4.4%. Consequently, for the above-identified tool configuration, a significant reduction of tool utilization may be expected for the given transport capability of the system 140.

For example, a corresponding metric for the tool utilization may be determined for a plurality of different tool configurations in order to determine the respective tool performance for a bandwidth of possible process situations encountered in the environment 150. In this way, it may be readily assessed whether or not the configuration of the tool 160 and/or a configuration of the system 140 is appropriate for covering the desired bandwidth of possible process situations with a required high degree of tool utilization. In other cases, the respective metrics for tool utilization may be determined for a plurality of the tools in the environment 150 in order to identify respective entities which are subjected to a high degree of influence with respect to the transport capability of the system 140. In still other examples, the respective transport capabilities of the system 140 may be "modified," for instance by using a different distribution for the actual CET values, in order to determine the degree and/or locations within the environment 150 requiring an appropriate adaptation of the system 140. Furthermore, various tool configurations, as well as other parameters, such as standard lot size in the environment 150, may be examined with respect to its influence on the tool utilization and thus on the overall performance of the manufacturing environment 150. For instance, for a given configuration of the block 163, the number of load ports 164 may be varied in order to obtain quantitative estimations for a plurality of process situations, wherein the corresponding loss of utilization may be assessed in view of increased equipment costs for process tools having an increased number of load ports. Moreover, an optimum standard lot size may be determined for a virtual or real manufacturing environment, which may significantly enhance the potential for increasing the overall productivity of the environment 150 with respect to company internal constraints and with respect to a certain economic situation, when a plurality of different product types are to be processed on demand.

As previously explained, typically different lot sizes may be present in the manufacturing environment 150, since research and development tasks may require the dispatching of moderately small lot sizes, pilot substrates may have to be processed and inspected prior to the processing of the actual product substrates, and the like. In some illustrative embodiments, a respective mix of lot sizes within the environment 150 may be taken into consideration when estimating a metric for the tool utilization on the basis of the principles as outline above. In one illustrative embodiment, a highly efficient algorithm may be obtained by assuming that a single standard lot size is dominant within a specific time horizon. In this case, it may be assumed that small substrate lots delivered to the process tool 160 are always followed by at least a sufficient number of carriers including the standard lot size so that all other load ports of the respective tool receive the standard lot size. A corresponding process flow may be readily achieved by appropriately designing the dispatching rules for entering substrates into the environment 150. Moreover, it is advantageous to avoid a "clustering" of carriers including small lot sizes, since undue delays may be created as the carrier exchange time is typically not dependent on the number of substrates contained therein. Hence, an increasing number of carrier exchange events may reduce the available time therefor, unless unwanted idle times are generated in the respective process tools. Furthermore, it may be assumed that respective delays caused by the processing of carriers with small lot size may completely occur at the next deliveries, i.e., at the next carrier exchange event, wherein any dynamic effects on subsequent carrier exchange events are ignored.

Figure 1I:
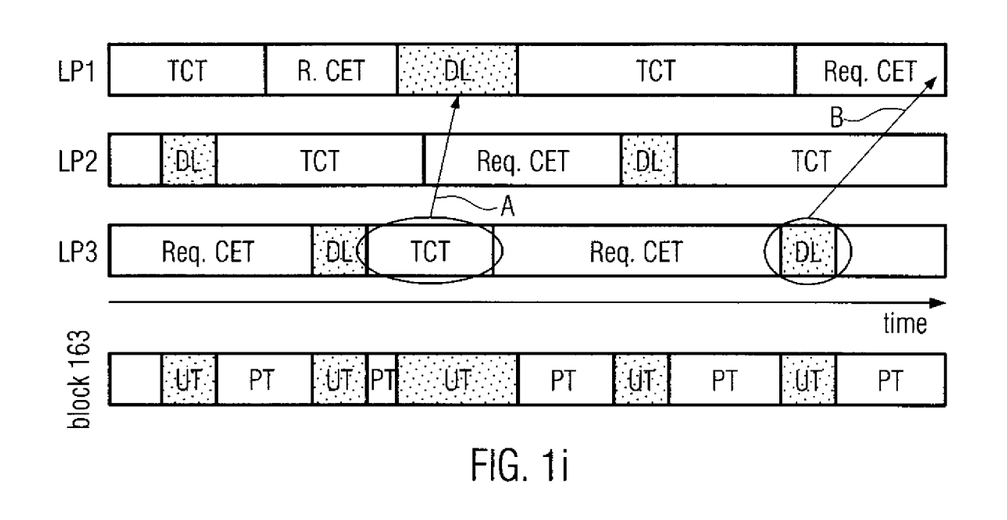
FIG. 1i schematically illustrates a time diagram for demonstrating the effect of the presence of a small lot size in one of the load ports of the process tool of FIG. 1a according to further illustrative embodiments disclosed herein.

FIG. 1i schematically illustrates a time diagram representing a process situation as described above, i.e., a carrier of reduced lot size may be processed in one of the load ports, in the example shown, the load port LP3, which means that a corresponding reduced total cycle time TCT is associated with the processing of the respective small lot size. Moreover, the other load ports LP1 and LP2 are provided with corresponding carriers including the standard lot size, as previously discussed. As indicated by arrow A, the corresponding reduced total cycle time at LP3 results in a corresponding increased delay at the load port performing the next carrier exchange operation, in this example, the load port LP1, since the reduced cycle time reduces the time available for exchanging the next carrier. Thus, the reduced total cycle time at LP3 may "consume" a portion of the required CET as previously determined for a continuous delivery of standard lot sizes. Moreover, as indicated, the number of unproductive cycles UT may correspondingly increase due to the additional delay at LP1. Moreover, as indicated by arrow B, the average delay at load port 3 for the next delivery would in this case not occur at LP3, since additional time would be available at LP3 due to the increased delay at LP1 providing for more time for carrier exchange at LP3. Instead, the corresponding delay would be expected at LP1, wherein, for convenience, any such dynamic impacts may be ignored during the further calculation. Moreover, the fraction of carriers with small lot size may be significantly less compared to the carriers of standard lot size and, with the assumptions above, i.e., ignoring minor dynamic effects of a delay of later carrier exchange events, assuming that one non-standard lot size is present at the process tool at a time, the delay for the standard lot size may be calculated as previously described. Furthermore, for the small lot sizes, the corresponding required CET may be calculated on the basis of the number of substrates on other carriers (WOOC) assuming that one standard lot size is currently in process, one load port is provided with the small lot size and the remaining load ports are also provided with a standard lot size. Consequently, according to Equation 2, a respective reduced required CET is obtained, since the number of substrates on other carriers is reduced. From the corresponding required CET (small), the delay may be calculated as previously described for the average delay of standard lot sizes. From the corresponding averaged delays for the standard lot size and the small lot size, a weighted average may be determined on the basis of the fraction of small lot sizes and standard lot sizes within the environment 150.

As an example, for the tool configuration as previously stated, i.e., three load ports, a wafer interval (WI) of 20 seconds and an operational capacity of 30 substrates simultaneously in the block 163 (WITS), it may be assumed that one of the load ports presently not processed may include a development lot having 13 wafers. That is, according to the assumption of a low number of small lot sizes, a standard lot size of 25 wafers is to be provided in the load port at which the next delivery is due, while 38 wafers may now be available, that is, one standard lot size and one smaller lot size. It may further be assumed that the total percentage of development lots having a lot size of 13 wafers is 5% of the total number of lots.

In this process situation, the required CET for the standard lot size would yield 422.9 seconds, as previously determined, while the required CET for the small lot size yields 160 seconds, that is 2 minutes and 40 seconds according to Equations 1 and 2, since WOOC, that is, the sum of wafers on other carriers, is 38. Determining the average delay for the required $CET_{SMALL}$ according to the procedure as described above for the average delay of the standard lot size yields 202.4 seconds.

Thus, an average delay for the situation of small lot sizes and standard lot sizes may be obtained by calculating a weighted average delay based on the frequency of development lots compared to standard lots. Hence, 0.95×22.9 seconds+0.05×202.4 seconds yields 31.9 seconds for the weighted average delay. Thus, as indicated by the increased delay compared to the delay for the standard lot sizes, a corresponding reduction of the tool utilization may be expected. In order to calculate an appropriate utilization loss factor as previously defined by loss factor=average delay/(average delay+lot size×WI), an average lot size may be determined for the process situation, i.e., the respective lot sizes may be weighted by the corresponding fractions 0.95 and 0.05 yielding an average lot size of 24.4. Using the above results yields 6.1% for the respective utilization loss factor.

As a result, the influence of different lot sizes on the performance of the process tools 160 in the environment 150 may be efficiently estimated in order to monitor and estimate the overall performance of the environment 150. As previously indicated, the scheduling and thus dispatching of substrates into the environment 150 may be controlled on the basis of the estimations obtained for a specific configuration of the environment 150, since respective calculations may be repeated with different lot sizes and lot mixtures in order to identify a respective process situation resulting in a desired high utilization of at least some of the process tools 160.

In other illustrative embodiments, when one or more of the process tools 160 are provided in the form of batch process tools, that is, a given number of substrates is stepped through the various processes as an entity, the algorithm described above may also be applied by replacing the wafer interval (WI) by the respective batch interval, replacing the sum of WOOC by the sum of complete batches contained in other carriers and by replacing the sum of WITS by the sum of batches that may be processed simultaneously in the respective batch tool.

As a result, the subject matter disclosed herein provides an efficient technique for quantifying performance losses that are correlated with the performance of an automatic material handling system, such as the system 140 previously described. By estimating a required carrier exchange time, tool- and process-specific characteristics may be incorporated in an appropriate metric that is comparable with the transport capability of the respective transport system. In illustrative embodiments, the transport capability, i.e., the performance of the transport system, may be described as an appropriate distribution of actual carrier exchange times which may then be efficiently compared with the determined required carrier exchange time so as to determine a respective delay which has to be expected with respect to the specified tool and process configuration due to the interaction between the transport system and the process tool. From the corresponding comparison, an appropriate utilization-related metric may be derived so as to have a quantitative measure for tool performance losses with respect to the transport capabilities in the respective manufacturing environment. Since the process of determining the respective estimations, for instance on the basis of an iterative process, is highly efficient, quantitative studies of a plurality of different process situations, tool configurations, transport system configurations and the like may be performed in order to enhance the performance of a given manufacturing environment, to re-establish a given manufacturing environment, or to duly install a manufacturing environment. Furthermore, corresponding utilization-related metrics may be established for many or all process tools in the respective environment, thereby providing the potential for identifying respective tools that may require an appropriate adaptation so as to obtain the desired performance. For example, the transport capability of a respective automated system may be locally adapted, for instance by providing respective substrate storage utilities, such as zero footprint storage (ZFS), in the vicinity of the respective tool so as to reduce the corresponding average carrier exchange time. In other cases, when respective tools are newly installed in the manufacturing environment, the tool configuration can be adapted in advance to the requirements, for instance by providing for a sufficient number of load ports in order to obtain the desired performance. Similarly, an optimum standard lot size may be determined for obtaining a desired tool utilization, while an appropriate lot size mix within the environment may also be determined in order to not unduly reduce the tool performance.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   determining for a specified process tool of a manufacturing environment under given process conditions a required carrier exchange time required for exchanging a substrate carrier containing processed substrates for a substrate carrier containing substrates to be processed in said specific process tool;
   determining an average delay of delivery of carriers on the basis of said required carrier exchange time and a range of actual carrier exchange times, said range of actual carrier exchange times representing the transport capability within said manufacturing environment; and
   determining a transport-related utilization value for said specified process tool on the basis of said average delay.

2. The method of claim 1, wherein determining an average delay further comprises iteratively determining an updated value for said required carrier exchange time on the basis of a previously determined difference and updating said difference on the basis of said updated value when said previously determined difference does not meet a predefined accuracy criterion.

3. The method of claim 1, wherein said required carrier exchange time is determined on the basis of tool characteristics including at least a number of load ports of said specific process tool.

4. The method of claim 3, wherein said tool characteristics include a representative cycle time, a number of substrates that can be simultaneously processed and a number of substrates contained in carriers other than a carrier to be exchanged next.

5. The method of claim 1, wherein said required carrier exchange time is determined on the basis of a number of substrates for each substrate carrier currently present in said specific process tool.

6. The method of claim 5, further comprising determining standard lot size for handling substrates in said manufacturing environment by determining said transport-related utilization value for a plurality of different lot sizes.

7. The method of claim 1, wherein said transport capability of said manufacturing environment is substantially provided by an automated material handling system.

8. The method of claim 7, further comprising modifying a local transport capacity of said automated material handling system for said specified process tool on the basis of said transport-related utilization value.

9. The method of claim 1, further comprising estimating a target process capacity of said specified process tool on the basis of said transport-related utilization value.

10. The method of claim 1, wherein said range of actual carrier exchange times is defined by a probabilistic distribution of carrier exchange times.

11. A method, comprising:
    defining a transport capability of an automated material handling system of a manufacturing environment by a probabilistic distribution for actual carrier exchange times with a specific process tool;
    determining a required carrier exchange time for said specific process tool on the basis of tool-specific characteristics, said specific process tool exchanging carriers containing substrates to be processed and carriers containing substrates processed in said specific process tool with said automated material handling system; and
    determining a metric for tool utilization of said specific process tool on the basis of said transport capability and said required carrier exchange time.

12. The method of claim 11, further comprising iteratively determining an average delay for carrier exchange using said probabilistic distribution and said required carrier exchange time.

13. The method of claim 11, further comprising determining said metric of tool utilization on the basis of a number of load ports of said specific process tool.

14. The method of claim 11, further comprising determining said metric of tool utilization for different numbers of substrates contained in said carriers to be exchanged.

15. The method of claim 11, wherein said tool characteristics include a representative cycle time of said specific process tool, a number of substrates that can be simultaneously processed and a number of substrates contained in carriers other than a carrier to be exchanged next.

16. The method of claim 11, further comprising modifying a local transport capacity of said automated material handling system for said specified process tool on the basis of said metric of tool utilization.

17. The method of claim 11, further comprising estimating a target process capacity of said specified process tool on the basis of said metric of tool utilization.

18. The method of claim 11, wherein said specific process tool represents a batch tool and said tool-specific characteristics comprise a batch cycle time, a number of batches simultaneously present in said specific process tool and a number of complete batches contained in carriers other than a carrier to be exchanged next.

19. A tool utilization estimation system, comprising:

an input section configured to receive process information related to a specific process tool in a manufacturing environment including an automated material handling system for exchanging substrate carriers with said specific process tool;

a transport capability estimator connected to said input section and configured to estimate an average delay of carrier exchange in said specific process tool on the basis of said process information and a range of actual carrier exchange times; and a utilization estimator configured to estimate a utilization loss factor on the basis of said average delay and said process information.

20. The tool utilization estimation system of claim 19, wherein said range of actual carrier exchange times is represented by a probabilistic distribution.

* * * * *